United States Patent Office.

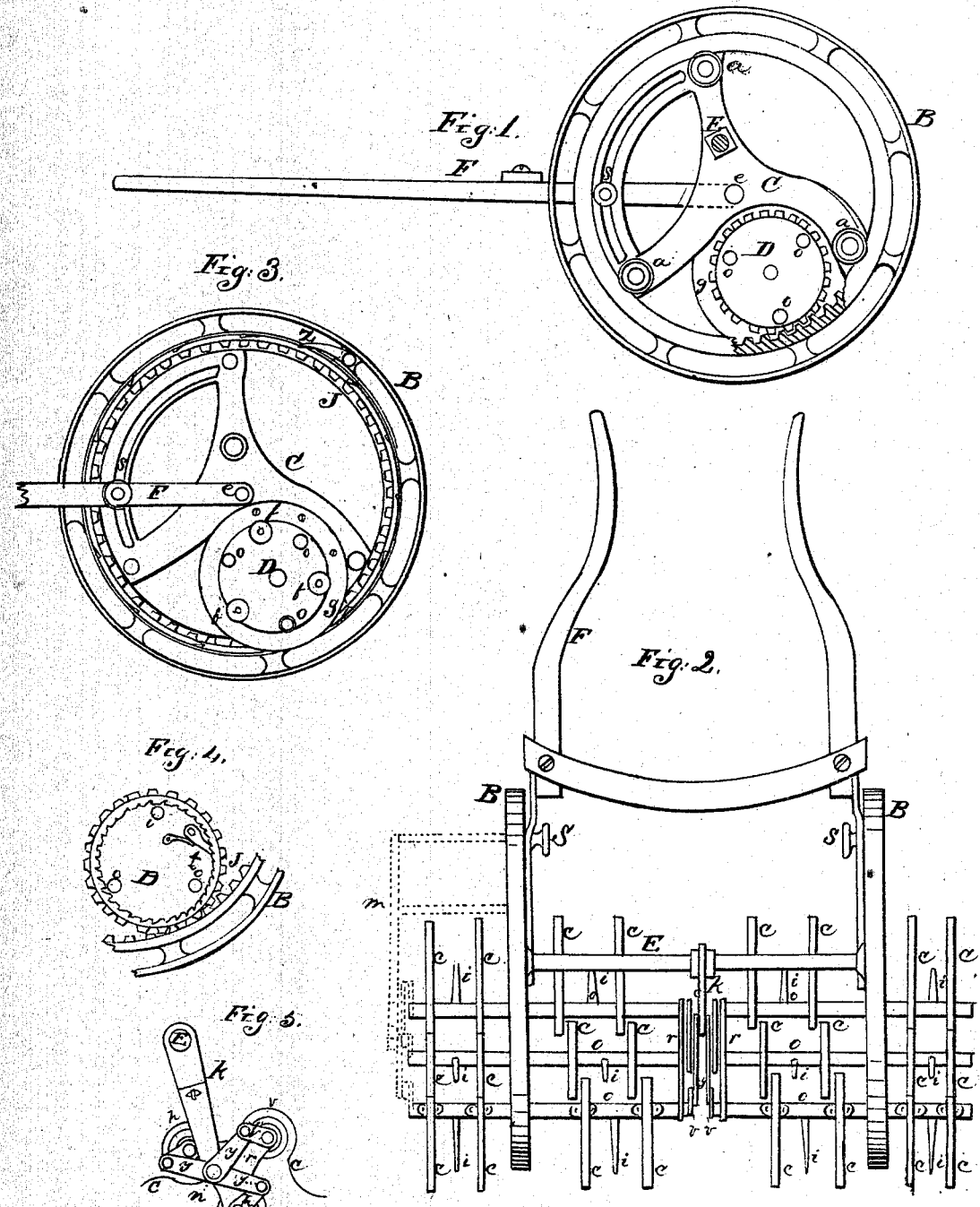

WILLIAM G. KENYON, OF WAKEFIELD, RHODE ISLAND.

Letters Patent No. 112,602, dated March 14, 1871.

IMPROVEMENT IN HAY-TEDDERS.

The Schedule referred to in these Letters Patent and making part of the same.

*To all whom it may concern:*

Be it known that I, WILLIAM G. KENYON, of Wakefield, in Washington county, in the State of Rhode Island, have invented new and useful Improvements in Hay-Tedders; and do hereby declare the following to be a full and correct description thereof, reference being had to the accompanying drawing making part of this specification and to the letters and numbers of reference marked thereon, similar letters and numbers being used in all the figures to denote the same part.

In the drawing—

Figure 1 shows a side elevation of the tedder.

Figure 2 is a top view.

Figure 3 is a view of one of the main wheels taken from the inside.

Figure 4 shows a plan for applying a ratchet-wheel connection between the main wheel and reel.

Figure 5 shows the parts in the middle of the reel that trip the forks.

Figures 6 and 7 are representations of the forks.

The nature of my invention consists, first, in the combination, as hereinafter described, of hollow driving-wheels, supporting-plates, and a reel or reels passing through the driving-wheels, one side of their centers to carry the forks outside of wheels to stir the hay beyond them. Also, in combining a stiff fork-tine with an elastic one, the first for the purpose of stirring the heavy portions of the hay, and the latter to brush the ground clear of the lighter ones.

The construction is as follows:

B B are two hollow wheels turning on the friction-rolls *a a a*, which run on studs in the ends of the arms of the plate C.

In recesses made in the inside edges of these hollow wheels are put inside gear-wheels or rings J J, which mesh into the gear on the head of the reel D.

These heads are held in place and turn on the friction-rolls *f f f*, fig. 3, which are pivoted to the heads and run on the inside edge of the plate *g*, which is fastened to the triangle C, grooves being made in the faces of the rolls to receive the edge of the plate.

The inner ends of the reels are held by a plate, *k*, fastened to the cross-bar E.

*o o o* are the bars of the reels to which the forks *c c c* and *i i i* are fastened, the bars being loose in the reel-heads so as to allow of turning to trip the forks, which is done by putting an arm, *h h*, on each bar, and connecting the outer ends of these arms by plates *y*, fig. 5, to the eccentric pin *n*, which is held by the plate *k* to one side of the center of the reel, so that, as the bars of the reel revolve around their center, the ends of the arms attached to them, being held by the plates to the pin *n*, will give the bars a rocking or tripping motion, so as to free the forks from the grass or hay after having raised it to the proper height.

This arrangement of parts for moving the forks may be placed outside of the main wheels, on a frame carried out from the plate C, as shown by the dotted lines *m*, fig. 2. Then the reel can be all in one.

To allow the machine to be moved backward without driving the reels, a pawl, *z*, is attached to the main wheel B, and ratchet-teeth cut in the outside of the toothed ring J, fig. 3, which is left loose in its recess so as not to be turned by the wheel B except when moved in the direction that the pawl will catch in the ratchet teeth.

Another mode of applying a ratchet is shown in fig. 4, where a toothed rim, having the ratchet-teeth on its inside, is placed loose on the reel-head, and a pawl, *t*, is fastened to the head, so as to drive the reel only in one direction.

The thills F are attached to the center of the plate G, and are secured by bolts *s′ s′* passing through them and curved slots in the plates C C, so that by loosening the bolts the plates C C may be turned to raise or lower the reels, as may be required.

The elastic tines of the forks are made of sheet metal by winding the strips, which have side ears at one end, in a spiral or involute form, and are secured to the bars *o o* by screws through holes in the side ears. The short stiff tines may be driven into the bars.

The operation is as follows:

The machine being drawn over the ground, the driving-wheels B B will cause the reels to revolve by the teeth in the rings J meshing into the teeth on the heads of the reels, and as the reels turn the fork-bars *o o o* will be held in such a position by the plates *y y y*, attached to the arms on them, and connecting them to the eccentric pin *n*, as will cause the forks to assume a perpendicular position when descending into the bar, and to move toward a horizontal one as they pass to the upper part of their revolution, so as to free them from the hay.

The height of the reels from the ground may be adjusted by loosening the bolts *s s*, and, after setting as desired, again tightening them.

A joint is made in the plate *k*, fig. 5, and the two parts are secured together by a bolt, so that the position of the eccentric pin $n$ can be changed to trip the forks at different places in the revolution of the reels.

Having thus described the construction and operation of my improvements,

What I claim as my invention, and desire to secure by Letters Patent, is—

1. The combination of the hollow driving-wheels, the plates O, and the reel or reels that carry the forks, these parts being constructed and arranged as described, so that the reel passes through the wheel wholly on one side of its center, substantially as set forth.

2. The combination of the short stiff tines $i$ with the elastic ones $c$ and bars $o$, substantially as and for the purpose set forth.

WM. G. KENYON.

Witnesses:
BENJAMIN ARNOLD,
FRANK H. ARNOLD.